US010202549B2

(12) United States Patent
Bauer et al.

(10) Patent No.: US 10,202,549 B2
(45) Date of Patent: *Feb. 12, 2019

(54) MIXTURES OF ALUMINUM PHOSPHITE WITH SPARINGLY SOLUBLE ALUMINUM SALTS AND FOREIGN IONS, PROCESS FOR THE PRODUCTION THEREOF AND THE USE THEREOF

(71) Applicants: Harald Bauer, Kerpen (DE); Sebastian Hoerold, Diedorf (DE); Martin Sicken, Cologne (DE)

(72) Inventors: Harald Bauer, Kerpen (DE); Sebastian Hoerold, Diedorf (DE); Martin Sicken, Cologne (DE)

(73) Assignee: Clariant International Ltd., Muttenz (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/362,881

(22) PCT Filed: Nov. 28, 2012

(86) PCT No.: PCT/EP2012/004909
§ 371 (c)(1),
(2) Date: Jun. 4, 2014

(87) PCT Pub. No.: WO2013/083251
PCT Pub. Date: Jun. 13, 2013

(65) Prior Publication Data
US 2015/0005427 A1 Jan. 1, 2015

(30) Foreign Application Priority Data

Dec. 5, 2011 (DE) .................. 10 2011 120 191

(51) Int. Cl.
C08K 3/32 (2006.01)
C09K 21/04 (2006.01)
C01B 25/163 (2006.01)

(52) U.S. Cl.
CPC ............ C09K 21/04 (2013.01); C01B 25/163 (2013.01); C08K 3/32 (2013.01); C01P 2004/61 (2013.01); C01P 2006/11 (2013.01); C01P 2006/62 (2013.01); C01P 2006/63 (2013.01); C01P 2006/64 (2013.01); C01P 2006/80 (2013.01); C01P 2006/82 (2013.01)

(58) Field of Classification Search
CPC ....................... C08K 3/32; C08K 2003/329
See application file for complete search history.

(56) References Cited

U.S. PATENT DOCUMENTS 5,256,718 A 10/1993 Yamamoto et al.
5,356,982 A * 10/1994 Razvan ............... C01B 25/163
423/306
5,965,639 A 10/1999 Yamauchi et al.
6,136,892 A 10/2000 Yamauchi et al.
6,207,736 B1 3/2001 Nass et al.
6,365,071 B1 4/2002 Jenewein et al.
7,179,400 B2 2/2007 Frlschkemuth et al.
8,551,371 B2 10/2013 Hawkes et al.
2006/0020064 A1 1/2006 Bauer et al.
2006/0287418 A1 12/2006 Bauer et al.
2013/0190432 A1 7/2013 Krause et al.
2014/0309339 A1 10/2014 Schneider et al.
2014/0309340 A1 10/2014 Schneider et al.
2014/0329933 A1 11/2014 Schneider et al.
2014/0336325 A1 11/2014 Bauer et al.
2014/0350149 A1 11/2014 Schneider et al.
2014/0371361 A1 12/2014 Bauer et al.
2015/0005421 A1 1/2015 Schneider et al.
2015/0018464 A1 1/2015 Bauer et al.

FOREIGN PATENT DOCUMENTS

| CA | 2 218 792 | 4/1998 |
|---|---|---|
| CA | 2 246 124 | 2/1999 |
| DE | 196 14 424 | 10/1997 |
| DE | 197 34 437 | 2/1999 |
| DE | 197 37 727 | 7/1999 |
| EP | 0 344 321 | 12/1989 |
| EP | 0 896 023 | 2/1999 |
| JP | H 02175604 | 7/1990 |
| JP | 08-198609 | 8/1996 |
| JP | 08198609 A * | 8/1996 |
| JP | 2899916 | 6/1999 |
| JP | 2011-225723 | 11/2011 |
| WO | WO 2004/048453 | 6/2004 |
| WO | WO 2012/045414 | 4/2012 |

OTHER PUBLICATIONS

Machine Translation of JP08-198609A. Aug. 6, 1996.*
Definition of extraneous. http://www.dictionary.com/browse/extraneous. As viewed on May 18, 2016.*
PCT International Search Report for PCT/EP2012/004909, dated Feb. 4, 2013.
English Translation of PCT International Preliminary Report on Patentability for PCT/EP2012/004909, dated Jun. 10, 2014.
Morris et al. "Synthesis and Structures of Two Isostructural Phosphites, Al2(HP03)2 and Ga2(PH03)3", Acta Cryst. C. vol. c50, 1990, pp. 473-476, XP009166285, p. 473-p. 474.

(Continued)

Primary Examiner — Stephen E Rieth

(57) ABSTRACT

The invention relates to mixtures of aluminum phosphite with sparingly soluble aluminum salts and nitrogen-free extraneous ions, comprising 80 to 99.898% by weight of aluminum phosphite of the formula (I)

$$Al_2(HPO_3)_3 \cdot xH_2O \qquad (I)$$

in which x is 0 to 4, 0.1 to 10% by weight of sparingly soluble aluminum salts and 0.002 to 10% by weight of nitrogen-free extraneous ions; to a process for preparation thereof and use thereof.

2 Claims, No Drawings

(56) References Cited

OTHER PUBLICATIONS

PCT international Search Report for PCT/EP2012/004907, dated Feb. 4, 2013.
PCT International Preliminary Report on Patentability for PCT/EP2012/004907, dated Jun. 10, 2014.
English abstract for JPH 02175604 dated Jul. 6, 1990.
Yang Yali, Li Niu, Xiang Shouhe, Guan Naijia. "Hydrothermal synthesis and structure characteristics of single aluminophosphite [Al2(HPO3)3(H2O)3]H2O crystals" Institute of New Catalytic Materials Science, Nankal University, Tianjin 300071, China, pp. 1-6. Oct. 2006.
Machine Englisn Translation of JP 2899616, Jun. 2, 1999.
Machine English Translation of JP 2011-225723, Nov. 10, 2011.
Machine English Translation of JP 08-198609, Aug. 6, 1996.
Definition of extraneous. www.dictionary.com/extraneous as viewed on May 18, 2016.
United States Patent and Trademark Office Office Action for U.S. Appl. No. 14/362,871 dated Jan. 8, 2016.
United States Patent and Trademark Office Office Action for U.S. Appl. No. 14/362,871 dated Aug. 8, 2016.
United States Patent and Trademark Office Office Action for U.S. Appl. No. 14/362,871 dated Apr. 21, 2017.
Definition of mixed. www.thefreedictionary.com/mixed as viewed on Jul. 20, 2016.

\* cited by examiner

MIXTURES OF ALUMINUM PHOSPHITE WITH SPARINGLY SOLUBLE ALUMINUM SALTS AND FOREIGN IONS, PROCESS FOR THE PRODUCTION THEREOF AND THE USE THEREOF

The present invention relates to mixtures of aluminum phosphite with sparingly soluble aluminum salts and extraneous ions, to processes for preparation thereof and to the use thereof.

The prior art discloses pure aluminum phosphites. These are microporous compounds similar to zeolites, in which aluminum ions and phosphite ions form a three-dimensional network of multimembered rings. They may contain water of crystallization or release water of crystallization with loss of the crystal structure and thus form anhydrates. They are typically produced by hydrothermal crystallization, i.e. above the boiling point of water under the autogenous pressure thereof.

The raw materials used are aluminum sources, for example readily soluble aluminum salts; the phosphorus sources used are alkali metal phosphite or phosphorous acid.

To facilitate the crystallization (Yang. Shiyou Xuebao, Shiyou Jiagong (2006), 22(Suppl.), 79-81), polynitrogen compounds are added as structure-directing agents—also called templates. A disadvantage is that templates can lower the thermal stability of the product. Another disadvantage is that readily soluble aluminum salts and alkali metal phosphites require the removal of the alkali metal salts inevitably obtained.

Additionally known are mixtures of aluminum phosphite and aluminum oxide or aluminum hydroxide.

It is an object of the present invention to provide mixtures of aluminum phosphite with sparingly soluble aluminum salts and extraneous ions, these mixtures being free of templates. It was a further object to provide a process which does not require the templates or the use of readily soluble aluminum or phosphite salts.

It has been found that, surprisingly, the inventive mixtures of aluminum phosphite with sparingly soluble aluminum salts and extraneous ions are usable as synergists to flame retardants. These flame retardant synergists need not themselves be flame-retardant, but may significantly enhance the efficacy of flame retardants. These flame retardant synergists are mixed together with the flame retardants and further polymer additives by kneading and extrusion with the polymer to be rendered flame-retardant. The resulting polymer mixture is then flame-retardant. This processing operation is effected at temperatures at which the polymer is in molten form and which can distinctly exceed 320° C. for a brief period. Synergists must be able to withstand these temperatures without decomposing, in order to retain their action. It has now been found that, surprisingly, the inventive mixtures of aluminum phosphite with sparingly soluble aluminum salts and extraneous ions are much more thermally stable than pure aluminum phosphites.

In addition, the prior art discloses aluminum phosphite hydrates. A disadvantage is the elimination of water which occurs in the course of heating. This is harmful in the course of processing of the synergist to give the flame-retardant polymer. The object of the invention is achieved by the inventive mixtures of aluminum phosphite with sparingly soluble aluminum salts and extraneous ions, since these are substantially free of water of crystallization.

The invention therefore relates to mixtures of aluminum phosphite with sparingly soluble aluminum salts and nitrogen-free extraneous ions, comprising 80 to 99.898% by weight of aluminum phosphite of the formula (I)

$$Al_2(HPO_3)_3 \cdot xH_2O \qquad (I)$$

in which x is 0 to 4,
0.1 to 10% by weight of sparingly soluble aluminum salts and 0.002 to 10% by weight of nitrogen-free extraneous ions.

Preference is given to mixtures comprising
88 to 99.79% by weight of aluminum phosphite of the formula (I)
in which x is 0 to 4,
0.2 to 5% by weight of sparingly soluble aluminum salts and
0.01 to 7% by weight of nitrogen-free extraneous ions.

Particular preference is given to mixtures comprising
94 to 99.4% by weight of aluminum phosphite of the formula (I)
in which x is 0 to 0.1,
0.3 to 3% by weight of sparingly soluble aluminum salts and
0.3 to 3% by weight of nitrogen-free extraneous ions.

The sparingly soluble aluminum salts are preferably aluminum hydroxide, aluminum hydroxychloride, polyaluminum hydroxyl compounds, aluminum carbonates, hydrotalcites $(Mg_6Al_2(OH)_{16}CO_3 \cdot xH_2O)$, dihydroxyaluminum sodium carbonate $(NaAl(OH)_2CO_3)$, aluminum oxides, aluminum oxide hydrate, mixed aluminum oxide hydroxides, basic aluminum sulfate and/or alunite.

The extraneous ions are preferably chlorides, complex chlorides, bromides; hydroxides, peroxides, peroxide hydrates, sulfites, sulfates, sulfate hydrates, acidic sulfates, hydrogensulfates, peroxosulfates, peroxodisulfates; nitrates; carbonates, percarbonates, stannates; borates, perborates, perborate hydrates; formates, acetates, propionates, lactates and/or ascorbates; and/or cations of the elements Li, Na, K, Mg, Ca, Ba, Pb, Sn, Cu, Zn, La, Ce, Ti, Zr, V, Cr, Mn, Fe, Co and/or Ni.

The invention also relates to a process for preparing mixtures of aluminum phosphite with sparingly soluble aluminum salts and nitrogen-free extraneous ions, which comprises crystallizing in a ratio of 2.5 to 3.5 mol of a non-salt phosphorus source with 2 mol of sparingly soluble aluminum salt in the presence of an auxiliary acid at 50 to 180° C. in a solvent and at a solids concentration of 2 to 60%.

Preferably, the sparingly soluble aluminum salts are aluminum hydroxide, aluminum hydroxychloride, polyaluminum hydroxyl compounds, aluminum carbonates, hydrotalcites $(MgeAl_2(OH)_{16}CO_3 \cdot xH_2O)$, dihydroxyaluminum sodium carbonate $(NaAl(OH)_2CO_3)$, aluminum oxides, aluminum oxide hydrate, mixed aluminum oxide hydroxides, basic aluminum sulfate and/or alunite, and the non-salt phosphorus source is phosphorous acid, phosphorus trioxide, phosphorus trichloride and/or hypophosphite.

The auxiliary acid is preferably hydrochloric acid, hypochlorous acid, chlorous acid, chloric acid, hydrogen bromide, hydrofluoric acid, hydrogen iodide, periodic acid, perchloric acid, sulfuric acid, hydrogensulfate, sulfurous acid, hydrogensulfites, peroxosulfuric acid, peroxodisulfuric acid; nitric acid, nitrous acid, phosphoric acid, phosphorous acid, peroxophosphoric acid, hypophosphorous acid, carbonic acid, silicic acid, hexafluorosilicic acid, boric acid and/or carboxylic acids.

The invention also relates to the use of mixtures of aluminum phosphite with sparingly soluble aluminum salts and nitrogen-free extraneous ions as an intermediate for further syntheses, as a binder, as a crosslinker or accelerator in the curing of epoxy resins, polyurethanes, unsaturated polyester resins, as polymer stabilizers, as crop protection compositions, as sequestrants, as a mineral oil additive, as an anticorrosive, in washing and cleaning composition applications, in electronics applications.

The present invention additionally provides for the use of mixtures of aluminum phosphite with sparingly soluble aluminum salts and nitrogen-free extraneous ions as a flame retardant, especially flame retardant for clearcoats and intumescent coatings, flame retardant for wood and other cellulosic products, as a reactive and/or nonreactive flame retardant for polymers, for production of flame-retardant polymer molding compositions, for production of flame-retardant polymer moldings and/or for rendering polyester and pure and blended cellulose fabrics flame-retardant by impregnation, and as a synergist in flame retardant mixtures.

The invention also relates to flame-retardant thermoplastic or thermoset polymer molding compositions and polymer moldings, films, filaments and fibers comprising 0.1 to 45% by weight of mixtures of aluminum phosphite with sparingly soluble aluminum salts and nitrogen-free extraneous ions, 55 to 99.9% by weight of thermoplastic or thermoset polymer or mixtures thereof, 0 to 55% by weight of additives and 0 to 55% by weight of filler or reinforcing materials, where the sum of the components is 100% by weight.

The invention likewise relates to flame-retardant thermoplastic or thermoset polymer molding compositions and polymer moldings, films, filaments and fibers comprising 0.1 to 45% by weight of a flame retardant mixture comprising 0.1 to 50% by weight of mixtures of aluminum phosphite with sparingly soluble aluminum salts and nitrogen-free extraneous ions and 50 to 99.9% by weight of flame retardant, 55 to 99.9% by weight of thermoplastic or thermoset polymer or mixtures thereof, 0 to 55% by weight of additives and 0 to 55% by weight of filler or reinforcing materials, where the sum of the components is 100% by weight.

The flame retardant in the aforementioned use preferably comprises diallylphosphinic acids and/or salts thereof and/or condensation products of melamine and/or reaction products of melamine with phosphoric acid and/or reaction products of condensation products of melamine with polyphosphoric acid or mixtures thereof; nitrogen-containing phosphates of the formulae $(NH_4)_y H_{3-y} PO_4$ and $(NH_4PO_3)_z$, where y is 1 to 3 and z is 1 to 10 000; benzoguanamine, tris(hydroxyethyl) isocyanurate, allantoin, glycoluril, melamine, melamine cyanurate, dicyandiamide and/or guanidine; magnesium oxide, calcium oxide, aluminum oxide, zinc oxide, manganese oxide, tin oxide, aluminum hydroxide, boehmite, dihydrotalcite, hydrocalumite, magnesium hydroxide, calcium hydroxide, zinc hydroxide, tin oxide hydrate, manganese hydroxide, zinc borate, basic zinc silicate and/or zinc stannate.

The flame retardant in the aforementioned use more preferably comprises melam, melem, melon, dimelamine pyrophosphate, melamine polyphosphate, melam polyphosphate, melon polyphosphate and/or melem polyphosphate and/or mixed poly salts thereof and/or ammonium hydrogenphosphate, ammonium dihydrogenphosphate and/or ammonium polyphosphate.

The flame retardant in the aforementioned use preferably also comprises aluminum hypophosphite, zinc hypophosphite, calcium hypophosphite, sodium phosphite, monophenylphosphinic acid and salts thereof, mixtures of dialkylphosphinic acids and salts thereof and monoalkylphosphinic acids and salts thereof, 2-carboxyethylalkylphosphinic acid and salts thereof, 2-carboxyethylmethylphosphinic acid and salts thereof, 2-carboxyethylarylphosphinic acid and salts thereof, 2-carboxyethylphenylphosphinic acid and salts thereof, oxa-10-phosphaphenanthrene (DOPO) and salts thereof and adducts onto para-benzoquinone, or itaconic acid and salts thereof.

Preferably, x is also 0.01 to 0.1.

Inventive mixtures of aluminum phosphite and sparingly soluble aluminum salts form as forced crystals in the course of crystallization. The sparingly soluble aluminum salts preferably form the core of the crystallized grains in the sense of core-shell crystals. Aluminum phosphite forms the shell. The aluminum phosphite preferably contains extraneous ions. The extraneous ions are chemically bound into the aluminum phosphite and cannot be removed by means of purification processes. They thus also differ from pure physical mixtures, in which the aforementioned components are present alongside one another and may be separable. This is not the case for the inventive mixtures of aluminum phosphite with sparingly soluble aluminum salts and nitrogen-free extraneous ions.

Preferred extraneous ions are Na, K, Ca, Mg.

Preferred extraneous ions are also anions or oxo anions of the elements of the seventh main group, such as chlorides, complex chlorides, bromides, chlorates and perchlorates.

Preferred extraneous ions are anions or oxo anions of the elements of the sixth main group, such as hydroxides, peroxides, peroxide hydrates, sulfites, sulfates, sulfate hydrates, hydrogensulfates, peroxosulfates and peroxodisulfates.

Preferred extraneous ions are anions or oxo anions of the elements of the fifth main group, such as hydrogenphosphites, phosphites, hypophosphite, phosphate, hydrogenphosphate and dihydrogenphosphate.

Preferred extraneous ions are anions or oxo anions of the elements of the fourth main group, such as carbonates, percarbonates and stannates.

Preferred extraneous ions are anions or oxo anions of the elements of the third main group, such as borates, perborates and perborate hydrates.

Preferred extraneous ions, such as anions of carboxylic acids, are formates, acetates, propionates, lactates, ascorbates and tartrates.

The inventive mixtures of aluminum phosphite with sparingly soluble aluminum salts and nitrogen-free extraneous ions preferably have a particle size of 0.1 to 1000 μm and a bulk density of 80 to 800 g/l, more preferably of 200 to 700 g/l.

The inventive mixtures of aluminum phosphite with sparingly soluble aluminum salts and nitrogen-free extraneous ions preferably have L color values of 85 to 99.9, more preferably of 90 to 98.

The inventive mixtures of aluminum phosphite with sparingly soluble aluminum salts and nitrogen-free extraneous ions preferably have a color values of −4 to +9, more preferably −2 to +6.

The inventive mixtures of aluminum phosphite with sparingly soluble aluminum salts and nitrogen-free extraneous ions preferably have b color values of −2 to +6, more preferably −1 to +3.

The color values are reported in the Hunter system (CIE-LAB system, Commission Internationale d'Eclairage). L values range from 0 (black) to 100 (white), a values from −a (green) to +a (red), and b values from −b (blue) to +b (yellow).

In the process according to the invention, an aluminum source, preferably comprising sparingly soluble aluminum salts, as described above, and a non-salt phosphorus source are crystallized in the presence of an auxiliary acid. Optionally, the auxiliary acid can be neutralized with nitrogen-free base.

Preferred non-salt phosphorus sources are phosphorous acid or precursors which can form phosphite ions under the conditions of the process, for example phosphorus trioxide ($P_2O_6$) which can form phosphorous acid under hydrolysis, phosphorus trichloride, or hypophosphite which can be converted to phosphite by oxidation.

The process according to the invention avoids the use of templates which pollute the wastewater or have to be removed in a costly and inconvenient manner, or, when they remain in the product, can worsen the thermal stability.

The process according to the invention also avoids the use of readily soluble aluminum salts or phosphite salts; instead, sparingly soluble aluminum salts and non-salt phosphorus sources are used. A disadvantage here is actually inadequate conversion, since the sparingly soluble aluminum phosphite crystallizes in the form of a shell on the raw material and thus hinders the progress of the reaction.

Surprisingly, the process according to the invention, in contrast, enables the full conversion of all reactants by complete or partial dissolution of the insoluble aluminum source. The dissolved aluminum can be crystallized with the phosphorus source. Partial dissolution is effected with catalytic or substoichiometric amounts of auxiliary acid. As a result, a smaller amount of raw materials (acid) is consumed and a smaller amount of wastes (salts) is released than if the phosphorous acid were to be used in excess in order to achieve the same effect.

Preferred auxiliary acids are acids and oxo acids of the elements of main group 7 of the Periodic Table of the Elements, of main group 6, of main group 5 or of main group 4, or carboxylic acids.

Particularly suitable acids are hydrochloric acid, hydrofluoric acid, chloric acid, perchloric acid, sulfuric acid, sulfurous acid, nitrous acid, nitric acid, carbonic acid, formic acid, acetic acid, propionic acid, lactic acid, ascorbic acid and tartaric acid. Preferably, the auxiliary acid itself is then neutralized with substoichiometric amounts of base.

Preferred bases for this purpose are alkali metal and alkaline earth metal hydroxides, for example sodium hydroxide solution and potassium hydroxide solution of varying concentrations, milk of lime, slaked lime and/or barium hydroxide solution.

Preferred reaction conditions are temperatures of 0 to 300° C., more preferably of 50 to 170° C., and reaction times of $10^{-7}$ to $10^2$ h. The pressure may vary between 1 and 200 MPa (=0.00001 to 200 bar), preferably between 10 Pa and 10 MPa.

Preference is given to an energy input of 0.083 to 10 kW/m³, more preferably 0.33-1.65 kW/m³.

Preferred solvents are water, formic acid, acetic acid and protic organic solvents, especially ethanol, methanol and propanol.

A preferred reaction methodology is to initially charge the aluminum source, phosphorus source and the auxiliary acid and, after the crystallization, to meter in the nitrogen-free base.

A preferred reaction methodology is to initially charge the aluminum source and the phosphorus source and to meter in the auxiliary acid in the course of crystallization.

A preferred reaction methodology is to initially charge the aluminum source and phosphorus source, to meter in auxiliary acid in the course of crystallization, and to meter in nitrogen-free base after the crystallization.

A preferred pH in the course of crystallization is 0 to 7, more preferably 0.5 to 6 and most preferably 1 to 5. The pH used in the course of crystallization may affect the thermal stability of the inventive aluminum phosphite mixtures.

The reaction methodology determines the concentrations of the reactants in the course of crystallization. This determines, for example, particle sizes and thermal stability of the products.

A preferred solids concentration is 2 to 30% by weight, more preferably 5 to 15% by weight.

A preferred ratio of auxiliary acid to phosphorus source is 0.1 to 50 mol % per mole of phosphorus, more preferably 1 to 20 mol %, most preferably 2 to 10 mol %.

A preferred ratio of nitrogen-free base to phosphorus source is 0.1 to 70 mol % per mole of phosphorus, more preferably 1 to 40 mol %, most preferably 1 to 30 mol %.

A preferred ratio of phosphorus source to the aluminum source is 3 mol/1 mol to 1 mol/3 mol, more preferably 2.5 mol/2 mol to 3.5 mol/2 mol.

Preference is given to the use of mixtures of aluminum phosphite with sparingly soluble aluminum salts and nitrogen-free extraneous ions as a flame retardant synergist.

Preferred dialkylphosphinic acids or salts thereof are those of the formula (II)

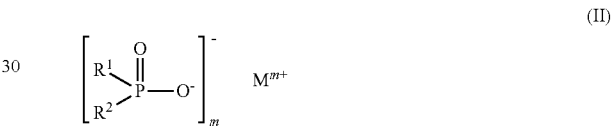

in which
$R^1$, $R^2$ are the same or different and are each linear or branched $C_1$-$C_6$-alkyl;
M is Mg, Ca, Al, Sb, Sn, Ge, Ti, Fe, Zr, Zn, Ce, Bi, Sr, Mn, Li, Na, K, H and/or a protonated nitrogen base;
m is 1 to 4.

Preferred dialkylphosphinic salts are aluminum trisdiethylphosphinate, aluminum trismethylethylphosphinate, titanyl bisdiethylphosphinate, titanium tetrakisdiethylphosphinate, titanyl bismethylethylphosphinate, titanium tetrakismethylethyiphosphinate, zinc bisdiethylphosphinate, zinc bismethylethylphosphinate and mixtures thereof.

Suitable further flame retardants are also particular nitrogen compounds (DE-A-196 14 424, DE-A-197 34 437 and DE-A-197 37 727). These are preferably those of the formulae (III) to (VIII) or mixtures thereof

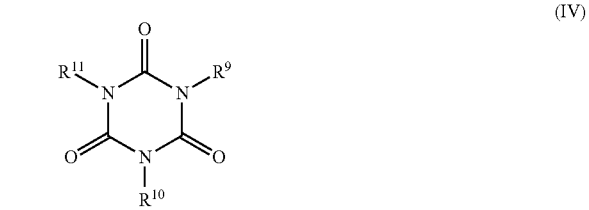

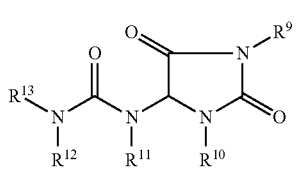
(V)

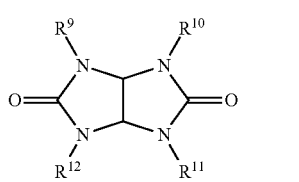
(VI)

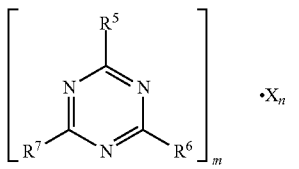
(VII)

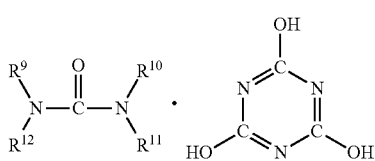
(VIII)

in which $R^5$ to $R^7$ are each hydrogen, $C_1$-$C_8$-alkyl, $C_5$-$C_{16}$-cycloalkyl or -alkylcycloalkyl, possibly substituted by a hydroxyl function or a $C_1$-$C_4$-hydroxyalkyl function, $C_2$-$C_8$-alkenyl, $C_1$-$C_8$-alkoxy, -acyl, -acyloxy, $C_6$-$C_{12}$-aryl or -arylalkyl, —$OR^8$ and —$N(R^8)R^9$, and also N-alicyclically or N-aromatically, $R^8$ is hydrogen, $C_1$-$C_8$-alkyl, $C_5$-$C_{16}$-cycloalkyl or -alkylcycloalkyl, possibly substituted by a hydroxyl function or a $C_1$-$C_4$-hydroxyalkyl function, $C_2$-$C_8$-alkenyl, $C_1$-$C_8$-alkoxy, -acyl, -acyloxy or $C_6$-$C_{12}$-aryl or arylalkyl, $R^9$ to $R^{13}$ are the same groups as $R^8$, and also —O—$R^8$, m and n are each independently 1, 2, 3 or 4, X denotes acids which can form adducts with triazine compounds (111);

or oligomeric esters of tris(hydroxyethyl) isocyanurate with aromatic polycarboxylic acids.

The remaining moisture content of the inventive mixtures of aluminum phosphite with sparingly soluble aluminum salts and nitrogen-free extraneous ions is 0.01 to 9%, preferably 0.05 to 0.5%.

Preferred polymer additives for flame-retardant polymer molding compositions and flame-retardant polymer moldings are UV absorbers, light stabilizers, lubricants, colorants, antistats, nucleating agents, reinforcing agents, fillers and/or synergists.

The invention also relates to polymer moldings, films, filaments and fibers comprising 1 to 50% by weight of the inventive mixtures of aluminum phosphite with sparingly soluble aluminum salts and nitrogen-free extraneous ions 50 to 99% by weight of polystyrene-based polymer or mixtures thereof 0 to 60% by weight of polymer additives 0 to 60% by weight of filler.

Preference is given in accordance with the invention to the use of the inventive flame-retardant polymer moldings as lamp components such as lamp fittings and holders, plugs and multisocket extensions, bobbins, housing for capacitors or contactors, and circuit breakers, relay housing and reflectors.

The invention also relates to an intumescent flame-retardant coating comprising 1 to 50% of the inventive mixtures of aluminum phosphite with sparingly soluble aluminum salts and nitrogen-free extraneous ions, and 50 to 99% by weight of ammonium polyphosphate, binder, foam former, fillers, dialkylphosphinic acid salts and/or polymer additives.

The polymers preferably originate from the group of the thermoplastic polymers such as polyester, polystyrene or polyamide, and/or the thermoset polymers.

The polymers are preferably polymers of mono- and diolefins, for example polypropylene, polyisobutylene, polybutene-1, poly-4-methylpentene-1, polyisoprene or polybutadiene, and addition polymers of cycloolefins, for example of cyclopentene or norbomene; and also polyethylene (which may optionally be crosslinked), e.g. high-density polyethylene (HDPE), high-density high-molar mass polyethylene (HDPE-HMW), high-density ultrahigh-molar mass polyethylene (HDPE-UHMW), medium-density polyethylene (MDPE), low-density polyethylene (LDPE), linear low-density polyethylene (LLDPE), branched low-density polyethylene (BLDPE), and mixtures thereof.

The polymers are preferably copolymers of mono- and diolefins with one another or with other vinyl monomers, for example ethylene-propylene copolymers, linear low-density polyethylene (LLDPE) and mixtures thereof with low-density polyethylene (LDPE), propylene-butene-1 copolymers, propylene-isobutylene copolymers, ethylene-butene-1 copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers and copolymers thereof with carbon monoxide, or ethylene-acrylic acid copolymers and salts thereof (ionomers), and also terpolymers of ethylene with propylene and a diene such as hexadiene, dicyclopentadiene or ethylidenenorbornene; and also mixtures of such copolymers with one another, e.g. polypropylene/ethylene-propylene copolymers, LDPE/ethylene-vinyl acetate copolymers, LDPE/ethylene-acrylic acid copolymers, LLDPE/ethylene-vinyl acetate copolymers, LLDPE/ethylene-acrylic acid copolymers and alternating or random polyalkylene/carbon monoxide copolymers and mixtures thereof with other polymers, for example polyamides.

The polymers are preferably hydrocarbon resins (e.g. $C_5$-$C_9$), including hydrogenated modifications thereof (e.g. tackifier resins) and mixtures of polyalkylenes and starch.

The polymers are preferably polystyrene (Polystyrene 143E (BASF)), poly(p-methylstyrene), poly(alpha-methylstyrene).

The polymers are preferably copolymers of styrene or alpha-methylstyrene with dienes or acrylic derivatives, for example styrene-butadiene, styrene-acrylonitrile, styrene-alkyl methacrylate, styrene-butadiene-alkyl acrylate and methacrylate, styrene-maleic anhydride, styrene-acrylonitrile-methyl acrylate; more impact-resistant mixtures of styrene copolymers and another polymer, for example a polyacrylate, a diene polymer or an ethylene-propylene-diene terpolymer; and block copolymers of styrene, for example styrene-butadiene-styrene, styrene-isoprene-styrene, styrene-ethylene/butylene-styrene or styrene-ethylene/propylene-styrene.

The polymers are preferably graft copolymers of styrene or alpha-methylstyrene, for example styrene onto polybutadiene, styrene onto polybutadiene-styrene or polybutadiene-acrylonitrile copolymers, styrene and acrylonitrile (or methacrylonitrile) onto polybutadiene; styrene, acrylonitrile and methyl methacrylate onto polybutadiene; styrene and maleic anhydride onto polybutadiene; styrene, acrylonitrile and maleic anhydride or maleimide onto polybutadiene; styrene and maleimide onto polybutadiene, styrene and alkyl acrylates or alkyl methacrylates onto polybutadiene, styrene and acrylonitrile onto ethylene-propylene-diene terpolymers, styrene and acrylonitrile onto polyalkyl acrylates or polyalkyl methacrylates, styrene and acrylonitrile onto acrylate-butadiene copolymers, and mixtures thereof, as known, for example, as ABS, MBS, ASA or AES polymers.

The styrene polymers are preferably comparatively coarse-pore foam such as EPS (expanded polystyrene), e.g. Styropor (BASF) and/or foam with relatively fine pores such as XPS (extruded rigid polystyrene foam), e.g. Styrodur® (BASF). Preference is given to polystyrene foams, for example Austrotherm® XPS, Styrofoam® (Dow Chemical), Floormate®, Jackodur®, Lustron®, Roofmate®, Styropor®, Styrodur®, Styrofoam®, Sagex® and Telgopor®.

The polymers are preferably halogenated polymers, for example polychloroprene, chlorine rubber, chlorinated and brominated copolymer of isobutylene-isoprene (halobutyl rubber), chlorinated or chlorosulfonated polyethylene, copolymers of ethylene and chlorinated ethylene, epichlorohydrin homo- and copolymers, especially polymers of halogenated vinyl compounds, for example polyvinyl chloride, polyvinylidene chloride, polyvinyl fluoride, polyvinylidene fluoride; and copolymers thereof, such as vinyl chloride-vinylidene chloride, vinyl chloride-vinyl acetate or vinylidene chloride-vinyl acetate.

The polymers are preferably polymers which derive from alpha,beta-unsaturated acids and derivatives thereof, such as polyacrylates and polymethacrylates, polymethyl methacrylates, polyacrylamides and polyacrylonitriles impact-modified with butyl acrylate, and copolymers of the monomers mentioned with one another or with other unsaturated monomers, for example acrylonitrile-butadiene copolymers, acrylonitrile-alkyl acrylate copolymers, acrylonitrile-alkoxyalkyl acrylate copolymers, acrylonitrile-vinyl halide copolymers or acrylonitrile-alkyl methacrylate-butadiene terpolymers.

The polymers are preferably polymers which derive from unsaturated alcohols and amines or the acyl derivatives or acetals thereof, such as polyvinyl alcohol, polyvinyl acetate, stearate, benzoate or maleate, polyvinyl butyral, polyallyl phthalate, polyallylmelamine; and copolymers thereof with olefins.

The polymers are preferably homo- and copolymers of cyclic ethers, such as polyalkylene glycols, polyethylene oxide, polypropylene oxide or copolymers thereof with bisglycidyl ethers.

The polymers are preferably polyacetals such as polyoxymethylene, and those polyoxymethylenes which contain comonomers, for example ethylene oxide; polyacetals which have been modified with thermoplastic polyurethanes, acrylates or MBS.

The polymers are preferably polyphenylene oxides and sulfides and mixtures thereof with styrene polymers or polyamides.

The polymers are preferably polyurethanes which derive from polyethers, polyesters and polybutadienes having both terminal hydroxyl groups and aliphatic or aromatic polyisocyanates, and the precursors thereof.

The polymers are preferably polyamides and copolyamides which derive from diamines and dicarboxylic acids and/or from aminocarboxylic acids or the corresponding lactams, such as nylon 2/12, nylon 4 (poly-4-aminobutyric acid, Nylon® 4, from DuPont), nylon 4/6 (poly(tetramethyleneadipamide)), Nylon® 4/6, from DuPont), nylon 6 (polycaprolactam, poly-6-aminohexanoic acid, Nylon® 6, from DuPont, Akulon® K122, from DSM; Zytel® 7301, from DuPont; Durethan® B 29, from Bayer), nylon 6/6 ((poly(N,N'-hexamethyleneadipamide), Nylon® 6/6, from DuPont, Zytel® 101, from DuPont; Durethan® A30, Durethan® AKV, Durethan® AM, from Bayer; Ultramid® A3, from BASF), nylon 6/9 (poly(hexamethylenenonanamide), Nylon® 6/9, from DuPont), nylon 6/10 (poly(hexamethylenesebacamide). Nylon® 6/10, from DuPont), nylon 6/12 (poly(hexamethylenedodecanediamide), Nylon® 6/12, from DuPont), nylon 6/66 (poly(hexamethyleneadipamide-co-caprolactam), Nylon® 6/66, from DuPont), nylon 7 (poly-7-aminoheptanoic acid, Nylon® 7, from DuPont), nylon 7,7 (polyheptamethylenepimelamide, Nylon® 7,7, from DuPont), nylon 8 (poly-8-aminooctanoic acid, Nylon® 8, from DuPont), nylon 8,8 (polyoctamethylenesuberamide, Nylon® 8,8, from DuPont), nylon 9 (poly-9-aminononanoic acid, Nylon® 9, from DuPont), nylon 9,9 (polynonamethyleneazelamide, Nylon® 9,9, from DuPont), nylon 10 (poly-10-aminodecanoic acid, Nylon® 10, from DuPont), nylon 10,9 (poly(decamethyleneazelamide), Nylon® 10,9, from DuPont), nylon 10,10 (polydecamethylenesebacamide, Nylon® 10,10, from DuPont), nylon 11 (poly-11-aminoundecanoic acid, Nylon® 11, from DuPont), nylon 12 (polylauryllactam, Nylon® 12, from DuPont, Grillamid® L20, from Ems Chemie), aromatic polyamides proceeding from m-xylene, diamine and adipic acid; polyamides prepared from hexamethylenediamine and iso- and/or terephthalic acid (polyhexamethyleneisophthalamide, polyhexamethyleneterephthalamide) and optionally an elastomer as a modifier, e.g. poly-2,4,4-trimethylhexamethyleneterephthalamide or poly-m-phenyleneisophthalamide; block copolymers of the aforementioned polyamides with polyolefins, olefin copolymers, ionomers or chemically bonded or grafted elastomers; or with polyethers, for example with polyethylene glycol, polypropylene glycol or polytetramethylene glycol. In addition, ethylene-propylene-diene rubber- (EPDM-) or ABS-modified polyamides or copolyamides; and polyamides condensed during processing ("RIM polyamide systems").

The polymers are preferably polyureas, polyimides, polyamidimides, polyetherimides, polyesterimides, polyhydantoins and polybenzimidazoles.

The polymers are preferably polyesters which derive from dicarboxylic acids and dialcohols and/or from hydroxycarboxylic acids or the corresponding lactones, such as polyethylene terephthalate, polybutylene terephthalate (Celanex® 2500, Celanex® 2002, from Celanese; Ultradur®, from BASF), poly-1,4-dimethylolcyclohexane terephthalate, polyhydroxybenzoates, and block polyether esters which derive from polyethers with hydroxyl end groups; and also polyesters modified with polycarbonates or MBS.

The polymers are preferably polycarbonates and polyester carbonates.

The polymers are preferably polysulfones, polyether sulfones and polyether ketones.

Preferably, the polymers are crosslinked polymers which derive from aldehydes on the one hand, and phenols, urea or melamine on the other hand, such as phenol-formaldehyde, urea-formaldehyde and melamine-formaldehyde resins.

The polymers are preferably drying and nondrying alkyd resins.

The polymers are preferably unsaturated polyester resins which derive from copolyesters of saturated and unsaturated dicarboxylic acids with polyhydric alcohols, and vinyl compounds as crosslinking agents, and also the halogenated, flame-retardant modifications thereof.

The polymers preferably comprise crosslinkable acrylic resins which derive from substituted acrylic esters, for example from epoxy acrylates, urethane acrylates or polyester acrylates.

Preferably, the polymers are alkyd resins, polyester resins and acrylate resins which have been crosslinked with melamine resins, urea resins, isocyanates, isocyanurates, polyisocyanates or epoxy resins.

The polymers are preferably crosslinked epoxy resins which derive from aliphatic, cycloaliphatic, heterocyclic or aromatic glycidyl compounds, for example products of bisphenol A diglycidyl ethers, bisphenol F diglycidyl ethers, which are crosslinked by means of customary hardeners, for example anhydrides or amines, with or without accelerators.

The polymers are preferably mixtures (polyblends) of the abovementioned polymers, for example PP/EPDM (polypropylene/ethylene-propylene-diene rubber), polyamide/EPDM or ABS (polyamide/ethylene-propylene-diene rubber or acrylonitrile-butadiene-styrene), PVC/EVA (polyvinyl chloride/ethylene-vinyl acetate), PVC/ABS (polyvinyl chloride/acrylonitrile-butadiene-styrene), PVC/MBS (polyvinyl chloride/methacrylate-butadiene-styrene), PC/ABS (polycarbonate/acrylonitrile-butadiene-styrene), PBTP/ABS (polybutylene terephthalate/acrylonitrile-butadiene-styrene), PC/ASA (polycarbonate/acrylic ester-styrene-acrylonitrile), PC/PBT (polycarbonate/polybutylene terephthalate), PVC/CPE (polyvinyl chloride/chlorinated polyethylene), PVC/acrylate (polyvinyl chloride/acrylate), POM/thermoplastic PUR (polyoxymethylene/thermoplastic polyurethane), PC/thermoplastic PUR (polycarbonate/thermoplastic polyurethane), POM/acrylate (polyoxymethylene/acrylate), POM/MBS (polyoxymethylene/methacrylate-butadiene-styrene), PPO/HIPS (polyphenylene oxide/high-impact polystyrene), PPO/PA 6,6 (polyphenylene oxide/nylon 6,6) and copolymers, PA/HDPE (polyamide/high-density polyethylene), PA/PP (polyamide/polyethylene), PA/PPO (polyamide/polyphenylene oxide), PBT/PC/ABS (polybutylene terephthalate/polycarbonate/acrylonitrile-butadiene-styrene) and/or PBT/PET/PC (polybutylene terephthalate/polyethylene terephthalate/polycarbonate).

Suitable compounding units for production of polymer molding compositions are single-shaft extruders or single-screw extruders, for example from Berstorff GmbH, Hanover and/or from Leistritz, Nuremberg, and multizone screw extruders with three-zone screws and/or short compression screws, and twin-screw extruders, for example from Coperion Werner & Pfleiderer GmbH & Co. KG, Stuttgart (ZSK 25, ZSK30, ZSK 40, ZSK 58, ZSK MEGAcompounder 40, 50, 58, 70, 92, 119, 177, 250, 320, 350, 380) and/or from Berstorff GmbH, Hanover, Leistritz Extrusionstechnik GmbH, Nuremberg.

Effective screw lengths (L) in the case of single-shaft extruders or single-screw extruders are 20 to 40D, and in the case of multizone screw extruders, for example, 25D with intake zone (L=10D), transition zone (L=6D), ejection zone (L=9D); in the case of twin-screw extruders 8 to 48D.

Suitable compounding units are also co-kneaders, for example from Coperion Buss Compounding Systems, Pratteln, Switzerland, e.g. MDKIE46-11D and/or laboratory kneaders (MDK 46 from Buss, Switzerland with L=11D).

Usable compounding units are also compounders with a contrarotatory twin screw, for example Compex 37 and 70 models from Krauss-Maffei Berstorff, and ring extruders, for example from 3+Extruder GmbH, Laufen, with a ring of three to twelve small screws which rotate about a static core, and/or planetary gear extruders, for example from Entex, Bochum, and/or vented extruders and/or cascade extruders and/or Maillefer screws.

Production, Processing and Testing of Flame-Retardant Polymer Molding Compositions and Polymer Moldings The flame-retardant components were mixed with the polymer pellets and any additives and incorporated in a twin-screw extruder (model: Leistritz LSM 30/34) at temperatures of 230 to 260° C. (PBT-GR) or of 260 to 280° C. (PA 66-GR). The homogenized polymer strand was drawn off, cooled in a water bath and then pelletized.

After sufficient drying, the molding compositions were processed on an injection molding machine (model: Aarburg Allrounder) at melt temperatures of 240 to 270° C. (PBT-GR) or of 260 to 290° C. (PA 66-GR) to give test specimens.

Test specimens of each mixture were used to determine the UL 94 fire class (Underwriter Laboratories) on specimens of thickness 1.5 mm. The UL 94 fire classifications are as follows:

V-0: afterflame time never longer than 10 sec, total of afterflame times for 10 flame applications not more than 50 sec, no flaming drops, no complete consumption of the specimen, afterglow time for specimens never longer than 30 sec after end of flame application V-1: afterflame time never longer than 30 sec after end of flame application, total of afterflame times for 10 flame applications not more than 250 sec, afterglow time for specimens never longer than 60 sec after end of flame application, other criteria as for V-0

V-2: cotton indicator ignited by flaming drops, other criteria as for V-1.

Not classifiable (ncl): does not fulfill fire class V-2.

Test of Thermal Stability and Phosphine Formation

An important criterion for the thermal stability of the inventive mixtures of aluminum phosphite with sparingly soluble aluminum salts and nitrogen-free extraneous ions is the temperature at which decomposition occurs and toxic phosphine ($PH_3$) is formed. The release thereof in the course of production of flame-retardant polymers must absolutely be avoided. For the determination, a material sample is heated in a tubular oven under flowing nitrogen (30 l/g), by raising the temperature stepwise. The decomposition temperature has been attained when a Dräger detection tube can detect more than 1 ppm $PH_3$ (short-term tube for hydrogen phosphide).

Determination of the Content of Water of Crystallization (Residual Moisture Content)

A specimen is heated to constant weight in a Nabertherm muffle furnace heated to 300° C. for 15 minutes. The mass of the residue based on the starting weight, calculated in percent and subtracted from 100, gives the weight loss.

The invention is illustrated by the examples which follow. Further data (starting weights, conditions, yields and analyses) can be found in tables 1 and 2.

EXAMPLE 1

674 g of aluminum hydroxide, 1511 g of 70% by weight phosphorous acid, 361 g of 25% by weight sulfuric acid and 11 067 g of demineralized water are initially charged in a 16 l high-pressure stirred vessel from Pfaudler, heated to 150° C. and stirred for 3 h. The resulting suspension is discharged and filtered at 80° C. by means of a heatable Seitz pressure filter and washed with demineralized water, redispersed and washed once again, then dried at 220° C. In a very high yield, an inventive mixture of aluminum phosphite with sparingly soluble aluminum salts and nitrogen-free extraneous ions is obtained with very high thermal stability ($PH_3$ formation from 360° C.).

EXAMPLE 2

As in example 1, aluminum hydroxide, 70% by weight phosphorous acid, 25% by weight sulfuric acid and 11 067 g of demineralized water are initially charged, heated to 150° C. and stirred for 23 h, then 688 g of 25% by weight sodium hydroxide solution are added and the mixture is stirred for 1 h. As in example 1, the suspension is discharged, filtered, washed and dried. In a very high yield, an inventive mixture of aluminum phosphite with sparingly soluble aluminum salts and nitrogen-free extraneous ions is obtained with very high thermal stability ($PH_3$ formation from 380° C.).

EXAMPLE 3

As in example 1, aluminum hydroxide, 70% by weight phosphorous acid and demineralized water are initially charged, heated to 120° C. and stirred for 6 h. During the reaction time, the pH of the solution is kept at pH=1 by metered addition of 1237 g of 25% by weight sulfuric acid. Shortly before the end of the reaction, 1054 g of 25% by weight sodium hydroxide solution are added. As in example 1, the suspension is discharged, filtered, washed and dried. In a very high yield, an inventive mixture of aluminum phosphite with sparingly soluble aluminum salts and nitrogen-free extraneous ions is obtained with very high thermal stability ($PH_3$ formation from 380° C.).

EXAMPLE 4

As in example 1, aluminum hydroxide, 70% by weight phosphorous acid and demineralized water are initially charged, heated to 100° C. and stirred for 24 h. During the reaction time, the pH of the solution is kept at pH=1.5 by metered addition of 361 g of 25% by weight sulfuric acid. As in example 1, the suspension is discharged, filtered, washed and dried. In a very high yield, an inventive mixture of aluminum phosphite with sparingly soluble aluminum salts and nitrogen-free extraneous ions is obtained with very high thermal stability ($PH_3$ formation from 380° C.).

EXAMPLE 5(COMPARATIVE)

A noninventive, commercially available aluminum phosphite shows a lower thermal stability in comparison ($PH_3$ formation from 320° C.).

Flame-Retardant Polymer Molding Compositions and Polymer Moldings

50% by weight of nylon 6,6 polymer, 30% by weight of glass fibers, 3.6% by weight of inventive mixture of aluminum phosphite with sparingly soluble aluminum salts and nitrogen-free extraneous ions according to example 3 and 16.4% by weight of Exolit® OP1230 aluminum diethylphosphinate (from Clariant) are used in accordance with the general methods specified to produce flame-retardant polymer molding compositions and flame-retardant polymer moldings in the form of UL-94 test specimens. The UL-94 test gives V-0 classification.

50% by weight of polybutylene terephthalate polymer, 30% by weight of glass fibers, 3.6% by weight of inventive mixture of aluminum phosphite with sparingly soluble aluminum salts and nitrogen-free extraneous ions according to example 3 and 16.4% by weight of Exolit® OP1240 aluminum diethylphosphinate (from Clariant) are used in accordance with the general methods specified to produce flame-retardant polymer molding compositions and flame-retardant polymer moldings in the form of UL-94 test specimens. The UL-94 test gives V-0 classification.

TABLE 1

Starting weights and reaction conditions

| | Starting weights | | | | | Conditions | |
|---|---|---|---|---|---|---|---|
| Example | Water [g] | Phosphorous acid [g] | Aluminum hydroxide [g] | Sulfuric acid 25% [g] | Sodium hydroxide solution 25% [g] | Temperature [° C.] | Reaction time [h] |
| 1 | 11067 | 1511 | 674 | 361 | — | 150 | 3 |
| 2 | 11067 | 1511 | 674 | 361 | 688 | 150 | 24 |
| 3 | 11067 | 1511 | 674 | 1237 | 1054 | 120 | 6 |
| 4 | 11067 | 1511 | 674 | 361 | — | 100 | 24 |
| 5 (comp.) | aluminum phosphite | | | | | | |

Aluminum hydroxide: Hydral ® 710, from Caldic

TABLE 2

Analysis results, compositions of the inventive products, test results

| | Analyses | | | | Addn. of the aluminum phosphite mixtures | | | |
|---|---|---|---|---|---|---|---|---|
| Example | aluminum [%] | phosphorus [%] | sodium [%] | sulfate [%] | aluminum phosphite [%] | aluminum hydroxide [%] | sodium [%] | sulfate [%] |
| 1 | 18.3 | 30.6 | 0.007 | 0.993 | 96.7 | 1.4 | 0.007 | 0.093 |
| 2 | 18.7 | 30.3 | 0.340 | 0.087 | 95.8 | 3.0 | 0.340 | 0.087 |

TABLE 2-continued

Analysis results, compositions of the inventive products, test results

| | Analyses | | | | Addn. of the aluminum phosphite mixtures | | | |
|---|---|---|---|---|---|---|---|---|
| Example | aluminum [%] | phosphorus [%] | sodium [%] | sulfate [%] | aluminum phosphite [%] | aluminum hydroxide [%] | sodium [%] | sulfate [%] |
| 3 | 17.2 | 29.5 | 5.000 | 0.190 | 93.2 | 0.1 | 5.000 | 0.190 |
| 4 | 18.4 | 29.2 | 0.003 | 3.000 | 92.3 | 4.0 | 0.003 | 3.000 |
| 5 (comp.) | | | | | 96.0 | 4.0 | | |

The invention claimed is:

1. A mixture of aluminum phosphite with sparingly soluble aluminum salts and nitrogen-free extraneous ions, comprising
94 to 99.4% by weight of aluminum phosphite of the formula (I)

$$Al_2(HPO_3)_3 \cdot xH_2O \qquad (I)$$

wherein x is 0 to 0.1,
0.3 to 3% by weight of sparingly soluble aluminum salts, wherein the sparingly soluble aluminum salts are aluminum hydroxide, aluminum hydroxychloride, poly-aluminum hydroxyl compounds, aluminum carbonates, hydrotalcites ($Mg_6Al_2(OH)_{16}CO_3 \cdot xnH_2O$), dihydroxy-aluminum sodium carbonate ($NaAl(OH)2CO3$), aluminum oxides, aluminum oxide hydrate, mixed aluminum oxide hydroxides, basic aluminum sulfate, basic aluminum alunite or mixtures thereof, and
0.3 to 3% by weight of nitrogen-free extraneous ions, wherein the extraneous ions are chlorides, bromides, hydroxides, peroxides, peroxide hydrates, sulfites, sulfates, sulfate hydrates, acidic sulfates, hydrogensulfates, peroxosulfates, peroxodisulfates, carbonates, percarbonates, stannates, borates, perborates, perborate hydrates, formates, acetates, propionates, lactates, ascorbates, cations of the elements Li, Na, K, Mg, Ca, Ba, Pb, Sn, Cu, Zn, La, Ce, Ti, Zr, V, Cr, Mn, Fe, Co and/or Ni.

2. A flame retardant, a flame retardant for clearcoats and intumescent coatings, a flame retardant for wood and other cellulosic products, a reactive or nonreactive flame retardant for polymers, a flame-retardant polymer molding composition, a flame-retardant for rendering polyester and pure and blended cellulose fabrics flame-retardant by impregnation, or a synergist in flame retardant mixtures comprising a mixture of aluminum phosphite with sparingly soluble aluminum salts and nitrogen-free extraneous ions, comprising
94 to 99.4% by weight of aluminum phosphite of the formula (I)

$$Al_2(HPO_3)_3 \cdot xH_2O \qquad (I)$$

wherein x is 0 to 0.1,
0.3 to 3% by weight of sparingly soluble aluminum salts, wherein the sparingly soluble aluminum salts are aluminum hydroxide, aluminum hydroxychloride, poly-aluminum hydroxyl compounds, aluminum carbonates, hydrotalcites ($Mg_6Al_2(OH)_{16}CO_3 \cdot xnH_2O$), dihydroxy-aluminum sodium carbonate ($NaAl(OH)_2CO_3$), aluminum oxides, aluminum oxide hydrate, mixed aluminum oxide hydroxides, basic aluminum sulfate, basic aluminum alunite or mixtures thereof, and
0.3 to 3% by weight of nitrogen-free extraneous ions, wherein the extraneous ions are chlorides, bromides, hydroxides, peroxides, peroxide hydrates, sulfites, sulfates, sulfate hydrates, acidic sulfates, hydrogensulfates, peroxosulfates, peroxodisulfates, carbonates, percarbonates, stannates, borates, perborates, perborate hydrates, formates, acetates, propionates, lactates, ascorbates, cations of the elements Li, Na, K, Mg, Ca, Ba, Pb, Sn, Cu, Zn, La, Ce, Ti, Zr, V, Cr, Mn, Fe, Co and/or Ni.

* * * * *